United States Patent [19]

Buchanan et al.

[11] Patent Number: 5,591,417
[45] Date of Patent: *Jan. 7, 1997

[54] REMOVING SOX, CO AND NOX FROM FLUE GASES

[75] Inventors: John S. Buchanan, Trenton; Mark F. Mathias, Turnersville, both of N.J.; Joseph F. Sodomin, III, Landenberg, Pa.; Gerald J. Teitman, Vienna, Va.

[73] Assignee: Mobil Oil Corporation, Fairfax, Va.

[ * ] Notice: The term of this patent shall not extend beyond the expiration date of Pat. No. 5,547,648.

[21] Appl. No.: 184,536

[22] Filed: Jan. 21, 1994

Related U.S. Application Data

[63] Continuation-in-part of Ser. No. 63,473, May 19, 1993, abandoned, and a continuation of Ser. No. 868,432, Apr. 15, 1992, Pat. No. 5,229,091.

[51] Int. Cl.[6] .......................... B01D 53/46; B01D 53/81; B01D 53/96
[52] U.S. Cl. .............. 423/210; 423/235; 423/244.02; 423/244.09; 423/246; 95/137; 588/205
[58] Field of Search .................... 423/222, 244.02, 423/235, 246, 244.07, 244.09, 210; 588/205, 206, 207; 95/137; 96/131

[56] References Cited

U.S. PATENT DOCUMENTS

| | | | |
|---|---|---|---|
| 3,755,535 | 8/1973 | Naber | 423/244 |
| 3,764,665 | 10/1973 | Groenendaal et al. | 423/574 |
| 3,780,498 | 12/1973 | Wenner | 55/73 |
| 3,835,031 | 9/1974 | Bertolacini et al. | 208/120 |
| 3,883,326 | 5/1975 | Wenner | 55/34 |
| 3,928,547 | 12/1975 | Daley et al. | 423/564 |
| 3,947,547 | 3/1976 | Groenendaal et al. | 423/242 |
| 3,966,879 | 6/1976 | Groenendaal | 423/244 |
| 3,987,154 | 10/1976 | Lagas | 423/574 |
| 4,041,131 | 8/1977 | Forbes | 423/242 |
| 4,059,418 | 11/1977 | Cull | 55/73 |
| 4,110,087 | 8/1978 | Nolley, Jr. | 55/73 |
| 4,122,150 | 10/1978 | Hori et al. | 423/242 |
| 4,147,763 | 4/1979 | McKinzie et al. | 423/570 |
| 4,193,894 | 3/1980 | Villadsen | 252/440 |
| 4,217,238 | 8/1980 | Sartori et al. | 252/192 |
| 4,233,276 | 11/1980 | D'Souza et al. | 423/230 |
| 4,263,020 | 4/1981 | Eberly, Jr. | 55/62 |
| 4,323,544 | 4/1982 | Magder | 423/239 |
| 4,369,130 | 1/1983 | Bertolacini et al. | 252/455 |
| 4,376,103 | 3/1983 | Bertolacini et al. | 423/244 |

(List continued on next page.)

FOREIGN PATENT DOCUMENTS

| | | |
|---|---|---|
| 790945 | 7/1968 | Canada . |
| 0110702 | 8/1988 | European Pat. Off. . |
| 0158858 | 10/1991 | European Pat. Off. . |
| 1444127 | 7/1976 | United Kingdom ............... 423/576.2 |
| 8606090 | 10/1986 | WIPO . |
| 8706156 | 10/1987 | WIPO . |

*Primary Examiner*—Gary P. Straub
*Assistant Examiner*—Timothy C. Vanoy
*Attorney, Agent, or Firm*—Malcolm D. Keen; Gerald L. Harris

[57] ABSTRACT

Removing sulfur oxide, carbon monoxide and nitrogen oxide in a flue gas stream by combusting fuel in the combustor with a reduced amount of oxygen to convert all sulfur-containing species in the flue gas stream to sulfur oxide, and to partially convert carbon monoxide therein to carbon dioxide, thus forming a sulfur oxide enriched gas stream having between at least about 500 ppm carbon monoxide and a consequential reduced amount of nitrogen oxide. The sulfur oxide enriched gas stream is contacted with a solid adsorbent bed for adsorbing the sulfur oxides in the form of inorganic sulfates and/or sulfur oxides. The solid adsorbent contains a catalytic oxidation promoter for oxidizing the carbon monoxide gas stream to carbon dioxide, thus forming a sulfur oxide and carbon monoxide depleted stream with the consequential reduced amount of nitrogen oxide for disposal. The adsorbent bed is then contacted with a reducing gas stream for regenerating the adsorbent bed to form a hydrogen sulfide and/or sulfur dioxide bearing stream.

29 Claims, 3 Drawing Sheets

U.S. PATENT DOCUMENTS

| | | | |
|---|---|---|---|
| 4,432,862 | 2/1984 | Swart et al. | 208/64 |
| 4,448,674 | 5/1984 | Bartholic | 208/113 |
| 4,459,371 | 7/1984 | Hobbs et al. | 502/341 |
| 4,469,589 | 9/1984 | Yoo et al. | 208/120 |
| 4,471,070 | 9/1984 | Siefert et al. | 502/302 |
| 4,472,267 | 9/1984 | Yoo et al. | 208/120 |
| 4,472,532 | 9/1984 | Mooi | 502/302 |
| 4,476,245 | 10/1984 | Siefert | 502/302 |
| 4,478,808 | 10/1984 | Matros et al. | 423/522 |
| 4,492,677 | 1/1985 | Yoo et al. | 423/244 |
| 4,492,678 | 1/1985 | Yoo et al. | 423/244 |
| 4,520,003 | 5/1985 | Petersson et al. | 423/533 |
| 4,522,937 | 6/1985 | Yoo et al. | 502/302 |
| 4,613,428 | 9/1986 | Edison | 208/113 |
| 4,617,175 | 10/1986 | Tolpin et al. | 422/171 |
| 4,642,178 | 2/1987 | Yoo et al. | 208/113 |
| 4,643,887 | 2/1987 | Daley et al. | 423/533 |
| 4,690,806 | 9/1987 | Schorfheide | 423/230 |
| 4,692,318 | 9/1987 | Tolpin et al. | 423/239 |
| 4,728,635 | 3/1988 | Bhattacharyya et al. | 502/304 |
| 4,735,705 | 4/1988 | Burk, Jr. et al. | 208/113 |
| 4,790,982 | 12/1988 | Yoo et al. | 423/239 |
| 4,826,664 | 5/1989 | Kay et al. | 423/21.1 |
| 4,830,733 | 5/1989 | Nagji et al. | 208/208 |
| 4,836,993 | 6/1989 | Bertolacini et al. | 423/244 |
| 4,857,285 | 8/1989 | Gal | 423/230 |
| 4,857,296 | 8/1989 | Brunnelle et al. | 423/574 |
| 4,857,297 | 8/1989 | Kettner et al. | 423/576.8 |
| 4,865,826 | 9/1989 | Carnell et al. | 423/230 |
| 4,918,036 | 4/1990 | Rheaume et al. | 502/66 |
| 4,963,520 | 10/1990 | Yoo et al. | 502/64 |
| 4,994,257 | 2/1991 | Suehiro et al. | 423/577 |
| 5,034,369 | 7/1991 | Hebrard et al. | 502/304 |
| 5,037,629 | 8/1991 | Berben et al. | 423/576.8 |
| 5,108,979 | 4/1992 | Magnabosco et al. | 502/304 |
| 5,116,798 | 5/1992 | Fennemann | 502/218 |

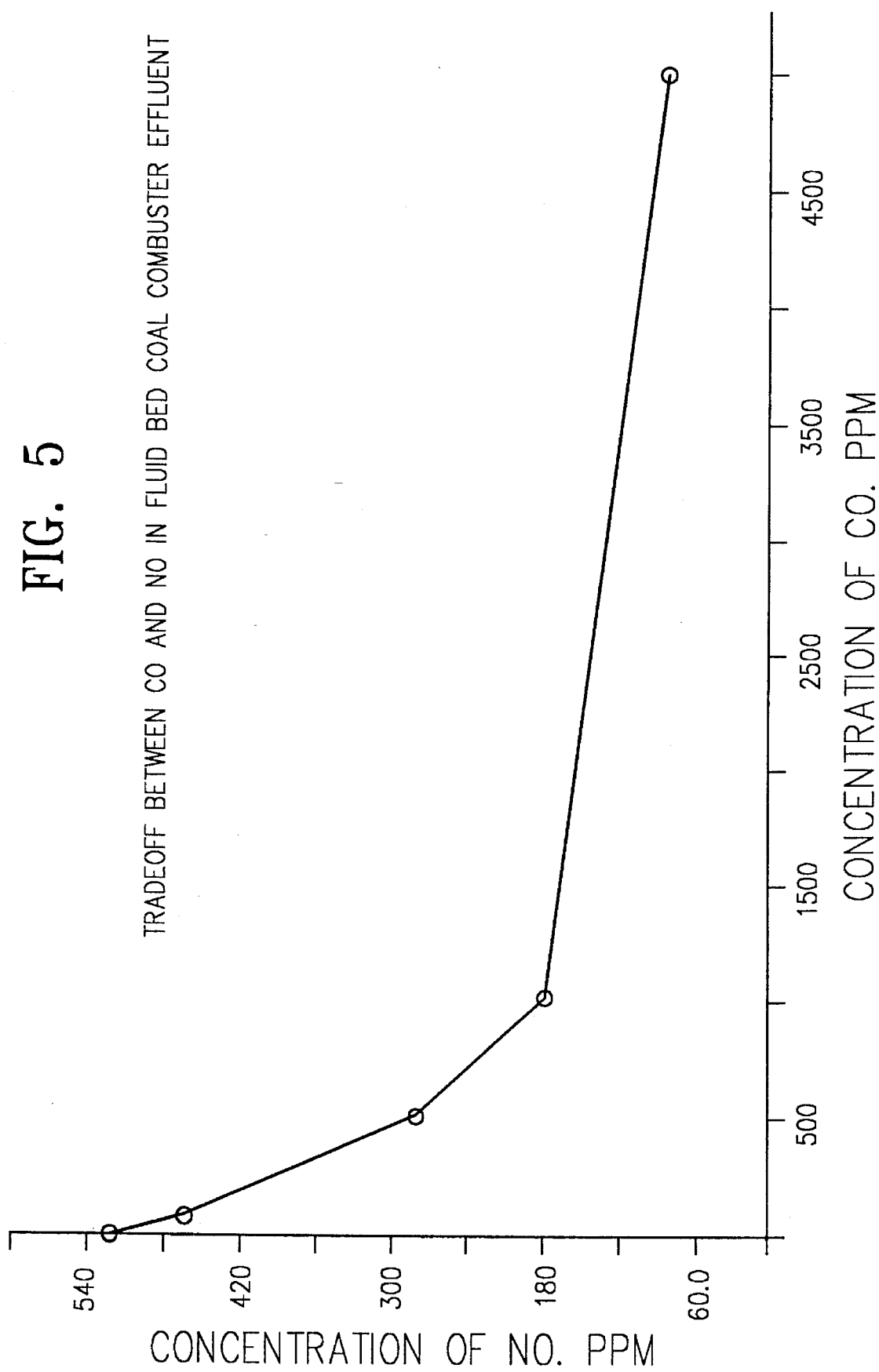

_5,591,417_

1

REMOVING SOX, CO AND NOX FROM FLUE GASES

CROSS-REFERENCE TO RELATED APPLICATIONS

This application is a continuation-in-part of application Ser. No. 08/063,473, filed May 19, 1993, now abandoned which is a continuation of application Ser. No. 07/868,432, filed Apr. 15, 1992, and now U.S. Pat. No. 5,229,091.

BACKGROUND OF THE INVENTION

The present invention relates to a process and a system for removing sulfur oxide and carbon monoxide from a gas stream. More particularly, the present invention relates to a process and system for the removal of sulfur oxide and carbon monoxide from a flue gas stream with an oxidation step using a reduced amount of combustion air which also results in a reduction of the amount of nitrogen oxide.

Combustor flue gas streams are typically desulfurized by injection of reactive solids such as lime or limestone, or by scrubbing in an alkaline aqueous solution. These treatments have varying degrees of effectiveness in removing SOx and do little to reduce NOx. The amount of air fed to combustors is usually maintained at greater than 110% of the stoichiometric requirement for complete combustion of fuels containing hydrogen and carbon to water and carbon dioxide. One reason for this amount of excess air is to ensure complete combustion of carbon monoxide to carbon dioxide.

SUMMARY OF THE INVENTION

In accordance with a broad aspect of the invention, there is provided a method of removing sulfur oxide, carbon monoxide and nitrogen oxide in a flue gas stream from a combustor using fuel and an oxygen-containing gas to generate a desired energy. The method comprises the steps of combusting the fuel in the combustor with a reduced amount of oxygen-containing gas to convert all sulfur-containing species in the flue gas stream to sulfur oxide, and to partially convert carbon monoxide therein to carbon dioxide, thus forming a sulfur oxide enriched gas stream having at least about 500 ppm carbon monoxide and a consequential reduced amount of nitrogen oxide, the amount of nitrogen oxide in the sulfur oxide enriched gas stream being an inverse function of the amount of carbon monoxide therein.

Then the sulfur oxide enriched gas stream is contacted with a solid adsorbent bed for adsorbing thereon the sulfur oxides in the form of inorganic sulfates or sulfur oxides or combinations thereof, the solid adsorbent containing a catalytic oxidation promoter for oxidizing the carbon monoxide in the sulfur oxide enriched gas stream to carbon dioxide, thus forming a sulfur oxide and carbon monoxide depleted stream with the consequential reduced amount of nitrogen oxide for disposal. Thereafter the adsorbent bed is contacted with a reducing gas stream for regenerating the adsorbent bed by reducing the retained inorganic sulfates or sulfur oxides or combinations thereof to hydrogen sulfide and/or sulfur dioxide, and thereby forming a hydrogen sulfide and/or sulfur dioxide bearing stream.

In accordance with a specific aspect of the invention, the method further comprises recovering sulfur from the hydrogen sulfide and/or sulfur dioxide bearing stream.

2

In accordance with another broad aspect of the invention, there is provided a system for removing sulfur oxide, carbon monoxide and nitrogen oxide in a flue gas stream from a combustor using fuel and an oxygen-containing gas to generate a desired energy. The system comprises means for combusting the fuel in the combustor with a reduced amount of oxygen-containing gas to convert all sulfur-containing species in the flue gas stream to sulfur oxide, and to partially convert carbon monoxide therein to carbon dioxide, thus forming a sulfur oxide enriched gas stream having at least about 500 ppm carbon monoxide and a consequential reduced amount of nitrogen oxide, the amount of nitrogen oxide in the sulfur oxide enriched gas stream being an inverse function of the amount of carbon monoxide therein. Means are included for contacting the sulfur oxide enriched gas stream with a solid adsorbent bed for adsorbing thereon the sulfur oxides in the form of inorganic sulfates or sulfur oxides or combinations thereof. The solid adsorbent has a catalytic oxidation promoter for oxidizing the carbon monoxide in the sulfur oxide enriched gas stream to carbon dioxide, thus forming a sulfur oxide and carbon monoxide depleted stream with the consequential reduced amount of nitrogen oxide for disposal. Means are provided for contacting the adsorbent bed with a reducing gas stream for regenerating the adsorbent bed by reducing the retained inorganic sulfates or sulfur oxides or combinations thereof to hydrogen sulfide and/or sulfur dioxide, and thereby forming a hydrogen sulfide and/or sulfur dioxide bearing stream.

In another specific aspect, there is provided means for recovering sulfur from the hydrogen sulfide and/or sulfur dioxide bearing stream.

Thus, the invention relates to removing sulfur oxide and carbon monoxide from a gas stream such as a flue gas resulting from the combustion or oxidation of a fuel which contains sulfur. By combusting the flue gas with a reduced amount of air, such that all sulfur compounds are converted to sulfur oxide, but only part of carbon monoxide is converted to carbon dioxide, there is an unexpected reduction in nitrogen oxide in the output from the combustor. The flue gas from the combustor is contacted with a regenerable solid sulfur oxide sorbent which contains a catalytic oxidation promoter for oxidizing the carbon monoxide. Preferred solid sorbents contain magnesium and aluminum oxides. The sorbents are regenerated by contact with a reducing gas, which causes the sulfur to be desorbed, mainly as $SO_2$ and $H_2S$ in a concentrated stream for recovery. Suitable reducing gases are hydrogen and/or hydrocarbons; or syngas (carbon monoxide and hydrogen).

BRIEF DESCRIPTION OF THE DRAWINGS

FIG. 2 is a graphic representation of a steep adsorption front case wherein the first serially connected bed is almost totally utilized before frontal break-through;

FIG. 5 is a graph relating the concentrations of CO to NO in the effluent of a fluid bed combustor.

DESCRIPTION OF SPECIFIC EMBODIMENTS

Figure 1:
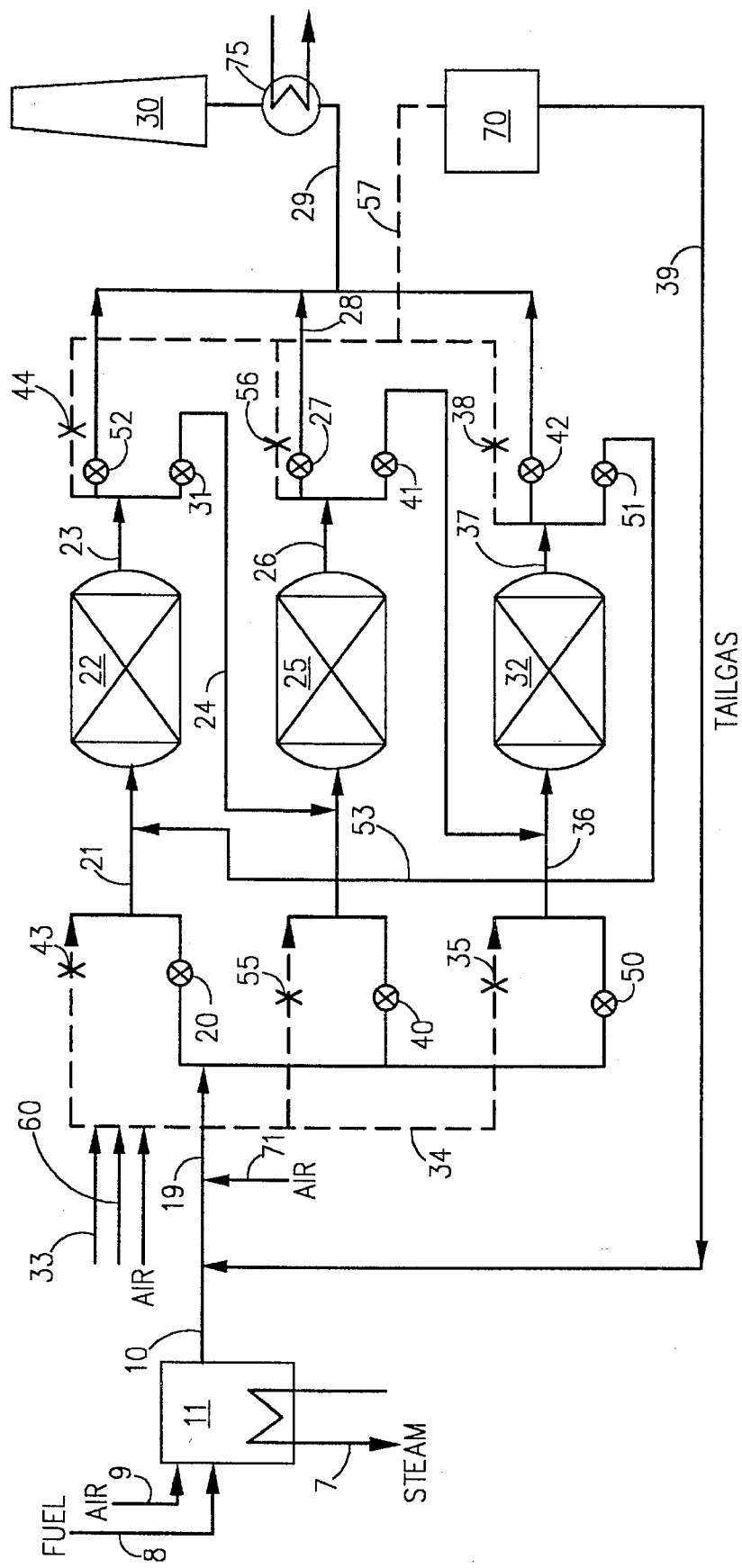
FIG. 1 is a schematic flow diagram of a three-bed system for recovering sulfur in accordance with the present invention from a gas stream including sulfur oxide and carbon monoxide.

The present invention provides for removing sulfur oxide and carbon monoxide from a flue gas resulting from combustion or oxidation of a fuel which contains sulfur, by contacting the flue gas with a regenerable solid sulfur oxide sorbent which contains a catalytic oxidation promoter. The promoter oxidizes carbon monoxide to carbon dioxide. Preferred solid sorbents contain magnesium and aluminum oxides. The sorbent is regenerated by contact with a reducing gas, which causes the sulfur to be desorbed, mainly as $SO_2$ and/or $H_2S$ in a concentrated stream for recovery. Sulfur may be recovered, in for example a Claus plant, from said hydrogen sulfide and/or sulfur dioxide bearing stream, or the stream may be fed to an amine scrubber.

The ability of the sorbent to oxidize carbon monoxide permits a reduction in the amount of combustion air and also a reduction in combustion temperature. Reduction of the amount of combustion air has a number of advantages, among them being an improvement in fuel efficiency and a reduction in the amount of nitrogen oxide formed in the combustor.

The amount of combustion air is reduced, from the prior art requirement of greater than 110%, to from about 95% to about 110% of a stoichiometric amount of air or oxygen to convert all carbon monoxide in the gas stream to carbon dioxide.

The reduced amount of air or oxygen supplied to the combustor is selected to maintain the concentration of carbon monoxide in the sulfur oxide enriched gas stream at greater than 500 ppm, and preferably between about 600 ppm and 5,000 ppm. The amount of nitrogen oxide in the sulfur oxide enriched stream is an inverse function of the amount of carbon monoxide therein. The reason there usually is a need for an amount of air in excess of the stoichiometric amount, and still maintain the quantity of carbon monoxide in excess of 500 ppm is due to the inefficiency of combustor to effectively use oxygen to completely combust the fuel.

The preferred sorbent is a mixed oxide of magnesium and aluminum, with suitable oxidation promoters, which has a sulfur oxide uptake capacity of about 50 wt %. Further, the contemplated system has demonstrated removal of $SO_2$ to below 1 ppm in the effluent to the stack. Finally, there is demonstrated the ability during sorbent regeneration to produce a concentrated stream of $SO_2$ and/or $H_2S$, suitable for further processing, for example in a Claus sulfur plant.

The preferred operating temperature for this process is about 1,200° F. for both adsorption of SOx and for regeneration of the sorbent. The sorbent is regenerated by contacting it with a reducing gas, such as hydrogen or light hydrocarbons or syngas (hydrogen and carbon monoxide). Sulfur is desorbed mainly as $SO_2$ and $H_2S$. Experiments have demonstrated that hydrogen promotes the formation of $SO_2$, while hydrocarbons can promote formation of either $H_2S$ or $SO_2$, depending on operating conditions. In general, lower regeneration temperatures and higher hydrocarbon flow rates favor production of $H_2S$. The $H_2S/SO_2$ ratio can be further adjusted within the sulfur recovery unit by additional air or reducing gas, to obtain the optimal $H_2S/SO_2$ ratio for that process. For the Claus sulfur recovery process, an $H_2S/SO_2$ ratio of about 2 is desired.

Combustion flue gases usually contain appreciable amounts of fine particulates, which can plug the interstices between the granules in a conventional fixed bed. Forming the solid sorbent into monoliths with unobstructed passages will mitigate this problem, and will reduce pressure drop through the bed.

However, with a moving bed, the sorbent is circulated between adsorption and regeneration vessels. A moving bed can have a number of advantages in a flue gas application. For example the moving bed will be less subject to adverse effects of particulates. In fact, a coarse moving bed of the solid sorbent can act as a filter to trap fly ash, and then release it as a concentrated stream of particulates. Further, heat exchange and temperature control within the bed is more easily handled with a moving bed, especially with a fluidized bed. Also, because the solid sorbent moves between the adsorption and regeneration vessels, numerous large valves, and the means of switching them every few hours, can be omitted from the process, with consequent savings in capital and maintenance costs. Another advantage is that a constant flow of regeneration offgas is obtained, rather than the intermittent flows associated with a swinging fixed bed operation. This can make the disposal of this offgas, e.g. in a Claus sulfur plant, much easier. Finally, changeout of sorbent is faster and more straightforward in a moving bed.

The ability of the preferred sulfur oxide sorbents to oxidize carbon monoxide allows a reduction in the amount of excess air used in the main combustor, since essentially complete CO combustion can be obtained in the downstream sorbent bed. Additional air can be added to the sorbent bed, as needed. The concentration of oxygen in the gas leaving the sorbent bed must be greater than 0.1 vol %, and preferably from about 1.0 to about 4.0 vol %. As noted above the amount of air fed to the combustor may fall below the stoichiometric amount needed to oxidize hydrocarbon fuel completely to water and carbon dioxide. In this case, the flue gas will contain large quantities (greater than 1.0 vol %) of carbon monoxide which will be oxidized in the sorbent bed. A fluidized bed with heat exchange (typically with coils for steam generation) is preferred for this application.

This reduction in excess air has at least two advantages. First, it will lead to cost reduction or increase in feed capacity of the combustor. The air blower and other components can be sized smaller, for the same fuel feed rate.

Second, running with less excess air or lower combustion temperature can result in lower NOx emissions from the combustor. Normally, it is difficult to take full advantage of this effect, because at these conditions, the production of carbon monoxide becomes large. This tradeoff between CO and NOx emissions is illustrated in FIG. 5, which shows NO effluent concentrations as a function of CO concentration, calculated using a model for a circulating fluid bed coal combustor. This graph is from "Modeling of NOx Formation in Fluidized Bed Combustion", presented by J. E. Johnson at the 16th IEA-AFBC meeting in Palo Alto, May 2, 1988. The graph indicates that the amount of combustion air is selected to preferably maintain the concentration of carbon monoxide in the combustor effluent at greater than 500 ppm, and more preferably between about 600 ppm and about 5,000 ppm to minimize the amount of nitrogen oxide in this effluent stream.

Besides oxidizing CO, the oxidation promoters associated with the SOx sorbent should oxidize trace amounts of hazardous organic compounds, such as dioxins, in flue gas to more benign forms.

Although this description of the invention is with respect to flue gas from combustors such as used in coal-burning electric power plants, the solid sorbent described here could also be used for cleanup of effluent gas from a variety of processes, including hazardous waste incinerators and mineral and metallurgical operations.

The flue gas that results from the combustion or oxidation of sulfur-containing materials, including the fossil fuels used in generation of steam and electric power, typically contains $SO_2$ and $SO_3$ ("SOx"). SOx emissions are being regulated more strictly, since they are believed to contribute to acid rain and other environmental problems. Complete combustion is rarely achieved, so the flue gas from combustion of carbonaceous fuels typically contains some CO. The materials described here can remove both SOx (by adsorption) and CO (by oxidation to $CO_2$). Fitting a furnace or combustor with the process and the system of the present invention cheaper high-sulfur coal or oil for fuel may be used.

With reference to FIG. 1, there is shown a preferred fixed-bed system wherein a combustion flue gas from a coal combustor 11 using fuel 8 (e.g. coal) and an oxygen-containing gas (e.g. air) 9 to generate a desired energy. In this case, the output is steam 7. Dependent on the type of fuel, e.g. hydrocarbon, coal, etc, the flue gas may contain in the order of 1,000 ppm of sulfur dioxide, 1,000 ppm of carbon monoxide, 15% carbon dioxide, 15% water, and the balance of nitrogen (with argon from the combustion air) and air. The flue gas stream 10 may have fed thereto a tailgas stream from an elemental sulfur recovery unit 70 (e.g. a Claus plant), and air 71 prior to being fed to stream 19 The temperature in the coal combustor is in the order of about 2,000° F.

A sulfur oxide enriched gas stream from the combustor 11 is fed by a line 19 through a valve 20, a line 21 to a first solid adsorbent bed 22. The outlet 23 of the first adsorbent bed 20 is connected through a valve 31, a line 24, to the inlet of a second solid adsorbent bed 25. The output 26 of the second bed 25 is connected through a valve 27, lines 28, 29 to a stack 30. The line 29 has a heat exchanger for removing heat from the line and using it to generate steam. Thus, the first 22 and second 25 beds are connected in series between the furnace 12 and the stack 30, and adsorb therein the sulfur oxides from the sulfur oxide enriched stream 19. The sulfur oxides are adsorbed in the form of inorganic sulfates or sulfur oxides or combinations thereof, and the sulfur oxide and carbon monoxide depleted stream is passed to the stack 30 by line 26, valve 27 and line 28.

The third solid adsorbent bed 32 is initially in a regeneration mode while the first and second beds are in an adsorbent mode. During regeneration, a stream of reducing gas from a source 33 travels by a line 34, a valve 35 and a line 36 to the third bed to reduce the retained inorganic sulfates or sulfur oxides or combinations thereof to hydrogen sulfide and/or sulfur dioxide and thus form a hydrogen sulfide and/or sulfur dioxide bearing stream which is sent to a Claus plant (70) by a line 37, a valve 38, and a line 57. Since regeneration of the third bed 32 will be completed before the first and second beds have adsorbed a desired amount of sulfur oxides, the third bed is preferably placed on standby by closing valves 35 and 38.

When a predetermined adsorption distribution in the first and second beds requires that the first bed be removed from the series, the feeds to each of the beds are realigned such that the second bed 25 and the third bed 32 are placed in series between line 19 and the stack by first closing valves 20 and 31, and opening valve 40 to disconnect the first bed 22 from the second bed 25 and to connect the sulfur oxide enriched stream from line 19 to the inlet of the second bed 25. At the same time valve 41 is opened to serially connect the third bed to the second bed and valve 42 is opened to provide a path from the outlet line 37 of the third bed to the line 29 to the stack 30.

As the second and third beds 25, 32 are being connected in series, the first bed 32 is placed in a regeneration mode by opening valves 43, 44 to provide a path for the reducing gas from the source 33, the valve 43, the line 22, the first bed 22, the line 23, the valve 44 and the line 57 to the Claus plant 70. The reducing gas then regenerates the first bed 22, and forms a hydrogen sulfide and/or sulfur dioxide stream which is sent to the Claus plant 70 via line 39. When the first bed is regenerated, the first bed is placed on standby by closing valves 43 and 44.

When the second and third beds 25, 32 have a predetermined adsorption distribution requiring that the second bed be removed from the series, the feeds to each of the beds are realigned such that the third and first beds 32, 22 are connected in series. The valves 50, 51, 52 to provide a path for the sulfur oxide enriched gas stream 19 through valve 50, line 36, the third bed 32, valve 51, line 53, to the inlet of the first bed 22, and the valve 52, the line 29, to the stack 30.

At the same time, the second bed is placed in a regeneration mode by opening valves 55, 56 to pass reducing gas to the second bed 25, and return the desorbed hydrogen sulfide and/or sulfur dioxide bearing stream to the Claus unit 70. Thus, each one of the three beds are sequentially placed in an initial bed mode in the series, taken out of the series for a regeneration mode and then placed in a second bed mode in the series.

While in an adsorbent mode, each of the beds 22, 25, 32 operate at a temperature from about 900° F. to about 1,400° F. A temperature of from about 1,100° F. to about 1,300° F. is preferred. The oxygen content of the stream 19 entering the beds in an adsorbent mode is in an amount of from about 0.10 to about 10 vol %, preferably from about 2 to about 4 vol %. Pressure within each bed should be maintained at a pressure of from about 0.1 to about 10 atmospheres, preferably from about 1.5 to about 3.0 atmospheres. GHSV should be from about 500 to about 20,000, and preferably from about 3,000 to about 5,000 GHSV. An additional benefit of operating each bed during the adsorbent mode within these parameters is that any carbon monoxide therein is converted into carbon dioxide which is released into the environment.

The adsorbent in each bed can be in the form of balls, pebbles, spheres, extrudates, channeled monoliths, microspheres or pellets. This sulfur oxide-capturing adsorbent provides absorbers or acceptors which absorb, and collect, or otherwise remove sulfur oxides from the effluent gaseous stream. In one embodiment, the bed contains Mg/Al spinels.

The outlet conduits 23, 26, 37 are monitored by a sensor. A suitable sensor is a Siemens Ultramat 22P infrared analyzer. Of course, as will be understood by those skilled in the art, other comparable analyzing equipment can be used.

Sulfur dioxide break-through occurs when a substantial increase in the concentration of sulfur dioxide occurs in one of the lines 23, 26, 37. This increase may be in the order of from about 3 ppm to about 250 ppm in less than about 2 minutes.

During regeneration of each adsorbent bed 22, 25, 32 the temperature is maintained between about 900° F. to about 1,400° F.; and the pressure in the bed is maintained at about 0.10 to about 10 atmospheres, preferably about 0.5 to about 3 atmospheres. The reducing gas stream 33 is directed into the bed under regeneration is at a gas hourly space velocity (GHSV) of about 10 to about 1,000, preferably about 100 to about 150. Initially, a GHSV of about 300 is preferred when commencing regeneration of a fixed-bed adsorbent so that a higher concentration of liberated gases can be removed from the regenerator. As regeneration proceeds, the GHSV can be reduced to about 50 as the concentration of liberated gases diminishes. Similarly, although hydrogen is the preferred reducing gas for regeneration, other hydrocarbon reducing gases can be used. These will preferably comprise $C_1$ through $C_5$ hydrocarbons. Substantially improved regeneration results are anticipated when water 60 is co-fed into the bed along with the hydrocarbons. The hydrogen and/or hydrocarbon stream 32 may contain 0.0 to 50% water. Syngas, a mixture of CO and hydrogen may also be used as a reducing gas.

COMPUTER SIMULATIONS

A computer simulation of adsorption fronts moving through fixed beds was written to explore the benefits of various process configurations. The computer model uses a shrinking core model, cast in cylindrical geometry, to described the SOx uptake by an individual particle. This model is described in reference works such as "Chemical Reactor Analysis and Design" by G. F. Froment and K. B. Bischoff (John Wiley and Sons, New York, 1979). The parameter values for the simulations were found to fit the breakthrough results in a laboratory reactor, with some allowance for sorbent aging. The operating conditions (e.g. bed length, flow rates, feed concentration) are suitable for a full scale embodiment.

For these experiments, the operating pressure and temperature were 1.1 atmospheres and 1,200° F. Other assumptions were a feed concentration of $SO_2$ of 0.43 vol %, gas velocity of 105 cm/sec, and an uptake capacity of the sorbent at long times of 46.5 SOx (as $SO_3$) per gram of fresh sorbent. The bed density was 0.707 g/cm³. The dimensionless parameter of effective diffusivity divided by the particle radius, and by the mass transfer coefficient had a value of 0.11. The maximum $SO_2$ concentration permitted in the effluent from the system was 1 ppm.

In the base case, the sorbent was distributed in two beds each having a 135 cm length. While one bed was on adsorption duty, the other was being regenerated or was on standby after regeneration. It takes a shorter period of time to regenerate then to complete an adsorption cycle. In the second case which is an embodiment of the present invention, the same amount of sorbent was distributed in three beds, each 90 cm long.

TWO-BED SYSTEM

From the time the feed was introduced to the first 135 cm bed until the time the effluent $SO_2$ concentration reached 1 ppm, was 1,118 min (18.6 hr). At this point adsorption on this bed was stopped, and the bed was switched to regeneration; while the other (regenerated) bed was switched into adsorption service. The total SOx loading on the first bed at this point was 36.8 wt %, therefore only 79.1% of the total uptake capacity of the sorbent could be utilized in this system. Each bed would be cycled once every 37.2 hr (i.e., 2×18.6 hr). This higher cycling rate results from less than 100% sorbent capacity utilization which can lead to faster sorbent deactivation.

Another disadvantage of the two-bed system of operation is that the beds are not switched until the $SO_2$ effluent concentration actually approaches the allowable limit. This makes for vulnerability to excessive emissions if a process upset should occur near the switching time. A partial solution to this problem would be to switch beds well before the effluent $SO_2$ concentration approaches the emission limit. However, this would have the effect of reducing sorbent capacity utilization even further.

Still another disadvantage of the two-stage system is that if significant $SO_2$ breakthrough at the bed exit is not permitted to occur, it can be difficult to monitor the condition of the sorbent, or even know how close the sorption front is to breakthrough. Thus, the operator would not know how much spare capacity is available in the bed.

THREE-BED SYSTEM

The three-bed system of the present invention solves the above-noted problems with the conventional 2-bed system. For comparison in model calculations, the same amount of sorbent was used as in the two-bed system, but was distributed in 3 beds, each 90 cm long. Two out of the three beds were always in series performing adsorption, while a third bed was on regeneration or standby following regeneration. At the time of valve switching, the first bed in the adsorption train switches to a regeneration mode, the second bed is moved to the first bed position, and the recently regenerated bed becomes the second bed in the adsorption train.

Operation of the three-bed system significantly differs from the two-bed system. As long as the length of the adsorption front within the beds is less than the length of a single reactor, nearly 100% sorbent utilization can always be attained. For this case, which is typical, the preferred time to switch reactors is when the $SO_2$ concentration in the effluent from the first bed reaches 95–100% of the feed concentration. At this point, the first bed is essentially saturated and is no longer sorbing much SOx. The adsorption front is then contained within the front section of the second bed. In other words, the preferred valve switching point is when the adsorption front has nearly completed passage past the exit of the first bed in the series. This contrasts with the 2-bed system where the usual valve switching point is just before the adsorption front starts passage out the exit of the single bed on adsorption duty.

The velocity of the adsorption front as it moves through a bed can be calculated from a simple mass balance:

$$\frac{\text{Front}}{\text{vel.}} = \frac{\text{(gas velocity) (SO2 molar feed conc.) (80 g/mol SO3)}}{\text{(sorbent bulk density) (sorbent uptake capacity)}}$$

For the conditions used in this simulation, the front velocity was 0.0955 cm/min. For a 90 cm bed length, the preferred bed switching time (i.e. the time for the front to propagate one bed length) was 15.7 hr. Therefore, each bed would be regenerated every 47.1 hr (=3×15.7 hr).

One advantage of the three-bed system is that the sorbent capacity is fully utilized. This translates into less frequent cycling of the sorbent, which can extend sorbent lifetime. Also, more deterioration in sorbent performance can be tolerated, since the intrinsic sorbent capacity is better utilized.

Another advantage of the three-bed system is that the full adsorption front can be allowed to break through the first bed. Monitoring of the timing and shape of this breakthrough curve can furnish valuable information on the state of the sorbent and on other developments such as nonideal flow patterns in the bed.

A third advantage of the three-bed system is that, at the time of bed switching, the adsorption front is contained in the front section of the second bed. The adsorption front, defined as the distance along the bed from a point where the $SO_2$ concentration in the gas phase drops below 99% of the feed concentration to where the $SO_2$ concentration drops to 1 ppm. For the example herein, the absorption front is about 43 cm long. Thus, at the preferred switching time, this front extended from the front of the second bed to a point 43 cm from its entrance. This left 47 cm (more than half the bed) as spare capacity in case of a process upset. For instance, if the switching event had to be delayed, adsorption could have continued anther 8.2 hours before 1 ppm $SO_2$ started to emerge in the effluent of the second bed.

It should be noted, however, that if subsequent cycles reverted immediately to the normal 15.7 hr switching interval, the adsorption front at the time of valve switching would remain at the exit of the second bed, leaving no spare capacity for further upsets. In order to move the location of the adsorption front (at the time of valve switching) to its preferred location near the entrance of the second bed, the next several valve switching must be made at intervals of less than 15.7 hr.

The three-bed system embodiment of the present invention provides a significant improvement in the configuration of the fixed-bed process, and economically reduces combustion flue gases and Claus tailgas effluent concentrations of sulfur and CO below the levels attained with current treatment technologies.

Figure 2:
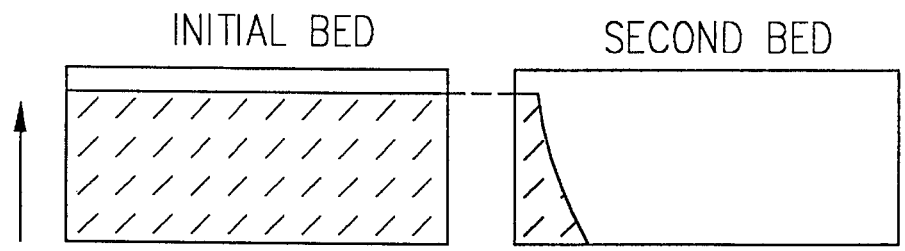

FIG. 2 is an example of a steep front case. The initial bed in the series is saturated to the exit of the bed. In this case the adsorption front is steep enough that it does not extend more than half-way into the second bed. This case provides almost total utilization of the initial bed, and then the initial bed is switched out of the adsorption mode and into a regeneration mode.

Figure 3:
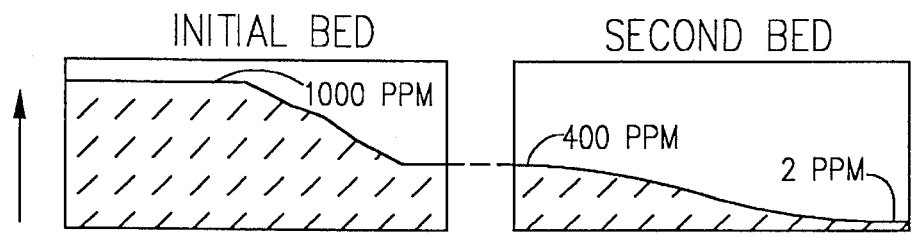
FIG. 3 is a graphic representation of a shallow adsorption front case wherein the beds are preferably switched before saturation of the first bed, and before frontal break-through of the second bed.

In a shallow adsorption front case shown in FIG. 3, which might arise with high gas flow rates and/or large particles, it is possible that the leading edge of the second bed is not yet saturated, e.g. the first bed may only be at an 80% adsorption level. However, in the second case, there still is an advantage by splitting into two beds.

If gas flows slower and/or particles are smaller then the more steep the front. Conversely, the faster the gas and/or the larger the particle, the more shallow the slope of the adsorption rate front.

STRATEGIES FOR SWITCHING BEDS

In the case of a very steep adsorption front, the system would switch the first bed from an adsorption mode to a regeneration mode when the effluent from the first bed reached about 95% of inlet concentration, because the first bed is almost totally saturated and there is little frontal penetration into the second bed. This defines one case of a predetermined adsorption distribution.

In the case of a very shallow adsorption front, there may be break through at the end of the second even though the first bed is not yet saturated. Thus, there is a need to monitor the exit from the second bed. The very shallow front defines a second case of a predetermined adsorption distribution.

In the intermediate case, which may be the most common, the effluent from the first bed is monitored and a mathematical model, such as the one used to calculate the results of this application, is used to predict or extrapolate what the shape of the adsorption front is in the second bed. To provide a margin of safety and to define a third case of a predetermined adsorption distribution, switching preferable occurs before the adsorption front reaches the end of the second bed, for example at 80% into the second bed.

Leading edge of the sloped adsorption front show adsorption levels at specific locations in the beds. The relatively flat trailing portion of the curve indicates that the bed(s) is saturated.

FLUIDIZED BED SYSTEM

Figure 4:
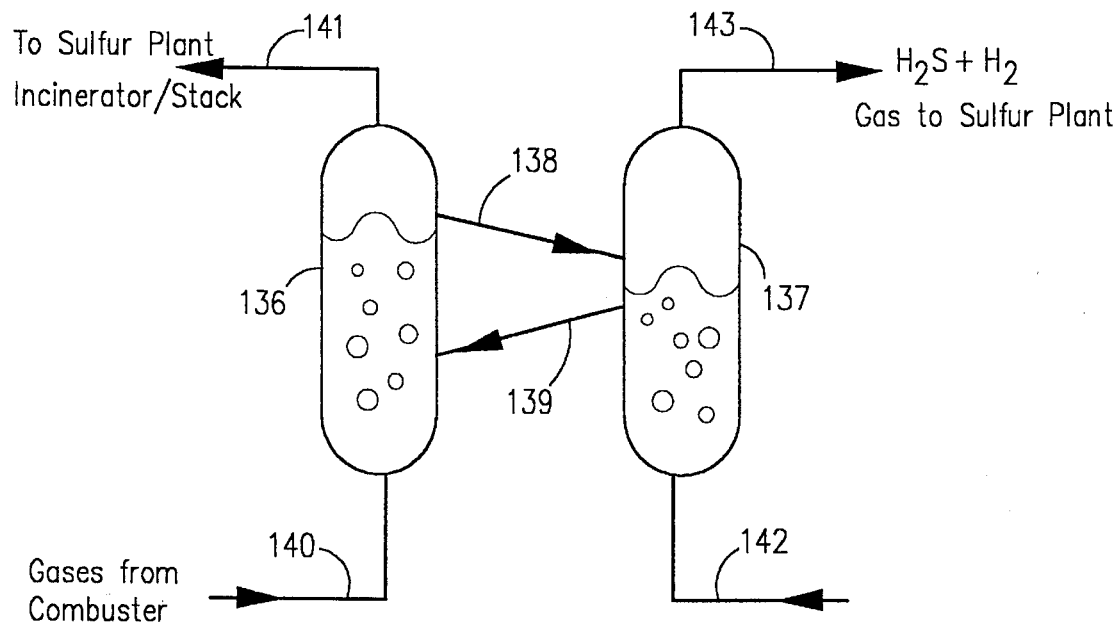
FIG. 4 is a schematic flow diagram of a fluidized bed system for recovering sulfur in accordance with another embodiment of the present invention.

With reference to FIG. 4, there is shown a fluidized bed system comprising a reactor 136, a regenerator 137, a conduit 138 for feeding spent adsorbent from the reactor 136 to the regenerator 137, and another conduit 139 for passing a fluidized bed of regenerated adsorbent from the regenerator 137 to the reactor 136. A sulfur oxide enriched stream 140 from the coal combustor 11 in FIG. 1 is fed to the lower end of the reactor 136, over adsorbent therein to strip out the sulfur oxides and provide a sulfur oxide and carbon monoxide depleted stream 141 for an incinerator or a stack. A hydrogen bearing or other reducing gas stream 142 is fed to the bottom of the regenerator 137 to reduce the sulfur compounds on the spent adsorbent to hydrogen sulfide and form a hydrogen sulfide and/or sulfur dioxide bearing outlet stream 143.

Operating parameters for the fluidized system are substantially the same as those described above with respect to the FIGS. 1 fixed-bed embodiment. Further, the operating conditions for the furnace 12 are similar when using either the fluidized or fixed bed systems. The temperature in the fluidized bed reactor 136 is maintained at from about 900° F. to about 1,400° F., preferably between about 1,100° F. to about 1,300° F. The oxygen content of the stream 140 introduced into the reactor 140 is maintained in an amount of from about 0.1 to about 10 vol %, preferably 2 to about 4 vol %. Pressure in the reactor 136 should be maintained at about 0.1 to about 10 atmospheres, preferably about 1.5 to about 3 atmospheres. The GHSV should be maintained at about 400 to about 7,000, preferably about 500 to about 2,500.

ADSORBENTS

Non-limiting examples of suitable solid adsorbents for use in the present invention include the porous solids, alumina, silica, silica-alumina, natural and synthetic zeolites, activated carbon, spinels, clays, and combinations thereof. Gamma alumina, chi-eta-rho alumina, delta alumina, and theta alumina are particularly useful as adsorbents and supports because of their high surface areas.

While alpha alumina and beta alumina can be used as adsorbents, they are not as effective as gamma, chi-eta-rho, delta and theta alumina. One or more oxides of other metals can also be used as adsorbents, either alone or in combination with alumina or as spinels, such as bismuth, manganese, yttrium, antimony, tin, copper, Group IA metals, Group IIA metals, rare earth metals, and combinations thereof. Magnesium aluminate spinels are particularly useful as adsorbents. These may be magnesium or aluminum rich with magnesium aluminate spinels preferred. Lanthanum and cerium are preferred rare earth metals. Naturally occurring rare earths, such as in the form of baestenite, are also useful adsorbents. Elemental copper or copper compound adsorbents, such as copper oxide adsorbents, can also be used. The copper oxide can be cuprous oxide and/or cupric oxide. Other copper compounds can be used, such as copper (II) sulfate, copper (II) acetate, copper (II) formate, copper (II) nitrate and/or copper (II) chloride. The adsorbents can also be a blend/mixture of high density and low density materials.

Also, a metal or metal oxide may be deposited on the solid adsorbent or may be used alone. The metal or metal oxide part of the adsorbents can be supported, carried and held on a refractory support or carrier material which also provides part of the adsorbents. The support controls the attrition and surface area characteristics of the adsorbents. The support preferably has a surface area greater than about 10 m$^2$/g and most preferably from about 50 m$^2$/g to about 500 m$^2$/g for best results. Suitable supporters include, but are not limited to, silica, alumina, kaolin or other clays, diatomaceous earth, boria, and/or mullite. The support can comprise the same material as the metal or metal oxide part of the adsorbents.

The adsorbents can be impregnated or otherwise coated with at least one oxidizing catalyst or promoter that promotes the removal of nitrogen oxides, the oxidation of $SO_2$ to $SO_3$ in the presence of oxygen, and the regeneration of the sorbent. It is believed that $SO_3$ is more readily adsorbed than $SO_2$. One useful catalyst is ceria (cerium oxide). Another useful catalyst is platinum. Other catalytic metals, both free and in combined form, preferably as an oxide form, can be used, either alone or in combination with each other or in combination with ceria and/or alumina, such as rare earth metals, metals from Group 8 of the Periodic Table, chromium, vanadium, rhenium, tungsten, silver and combinations thereof. The promoter can comprise the same material as the adsorbent. An even distribution of the promoter is preferred for best results and to minimize adsorbent erosion.

Useful Group IA metals include lithium, sodium, potassium, rubidium, and cesium. Useful Group IIA metals include magnesium, calcium, strontium, and barium. Useful Group VIII metals are the Group VIII noble metals (the platinum family of metals) including ruthenium, rhodium, palladium, osmium, iridium, and platinum. The rare earth metals are also useful and are referred to as the lanthanides. Suitable rare earth metals include cerium, praseodymium, neodymium, samarium, europium, gadolinium, terbium, dysprosium, holmium, erbium, thulium, ytterbium, and lutetium.

Preferably, the promoter may be selected from the rare earth metals, the platinum group metals and mixtures thereof. Particularly good results are achieved when the promoter is cerium and/or platinum, with cerium giving outstanding results.

A second promoter, if present, may be selected from the metal or the metal oxide form of iron, nickel, titanium, chromium, manganese, cobalt, germanium, tin, bismuth, molybdenum, antimony, vanadium and mixtures thereof. More preferably, the second promoter is selected from iron, nickel, cobalt, manganese, tin, vanadium and mixtures thereof. Additional metals may be also incorporated into the sorbent. For example, the sorbent may include small or trace amounts of additional metals or metal oxides, such as lanthanum, iron, sodium, calcium, copper, and titanium.

The specific amounts of the promoters included in the solid sorbent, if present at all, may vary widely. Preferably, the first promoter is present in an amount between about 0.001% to about 20% by weight, calculated as elemental metal, of the solid sorbent, and the second promoter is present in an amount between about 0.001% to about 10% by weight, calculated as elemental metal, of the solid sorbent. Preferably, the solid sorbent includes about 0.1% to about 20%, more preferably about 0.2% to about 20%, and still more preferably about 0.5% to about 15%, by weight of rare earth metal, calculated as elemental metal. Of course, if a platinum group metal is employed in the solid sorbent, very much reduced concentrations (e.g., in the parts per thousand to parts per million (ppm) range) are employed. If vanadium is included as the second promoter, it is preferably present in an amount of about 0.01% to about 7%, more preferably about 0.1% to about 5%, and still more preferably about 0.5% to about 2% by weight of vanadium, calculated as elemental metal.

The promoters may be associated with the solid sorbent using any suitable technique or combination of techniques; for example, impregnation, coprecipitation, ion-exchange and the like, well known in the art. Also, the promoters may be added during synthesis of the sorbent. Thus, the promoters may be an integral part of the solid sorbent or may be in a phase separate from the solid sorbent (e.g., deposited on the solid sorbent) or both. These metal components may be associated with the solid sorbent together or in any sequence or by the same or different association techniques. Cost considerations favor the preferred procedure in which the metal components are associated together with the sorbent. Impregnation may be carried out by contacting the sorbent with a solution, preferably an aqueous solution, of the metal salts.

It may not be necessary to wash the sorbent after certain soluble metal salts (such as nitrate, sulfate or acetate) are added. After impregnation with the metal salts, the sorbent can be dried and calcined to decompose the salts, forming an oxide in the case of a nitrate, sulfate or acetate.

The above-mentioned adsorbents are discussed in U.S. Pat. No. 4,692,318, which patent is hereby incorporated herein by reference.

In one general aspect, the present invention may involve use of a sorbent which is represented by the following empirical formula: $Mg_xAl_yO_z$, where the atomic ratio of x to y ranges from about 0.1 to about 10, and where z is at least as required to accommodate the valances of the Mg and Al components of the sorbent. This sorbent may have the spinel structure, and may contain one or both promoters described above.

Metal-containing spinels according to the above empirical formula that are useful in the present invention include the alkaline earth metal spinels, in particular magnesium (first metal) and aluminum (second metal)-containing spinel. Other alkaline earth metal ions, such as calcium, strontium, barium and mixtures thereof, may replace all or a part of the magnesium ions. Similarly, other metal ions, such as iron, chromium, vanadium, manganese, gallium, boron, cobalt, Group IB metals, Group IV metals, Group VA metals, the platinum group metals, the rare earth metals, Te, Nb, Ta, Sc, Zn, Y, Mo, W, Tl, Re, U, Th and mixtures thereof, may replace all or a part of the aluminum ions, preferably only a part of the aluminum ions.

The metal-containing spinels useful in the present invention may be derived from conventional and well known sources. For example, these spinels may be naturally occurring or may be synthesized using techniques well known in the art. Thus, a detailed description of such techniques is not included herein. A particularly useful process for preparing the solid sorbent is presented in U.S. Pat. No. 4,728,635, the specification of which is incorporated by reference herein.

The Group IA, IIA, IB metals, Group IIB metals, Group IV metals, Group VA metals, Group VIA, and Group VIII metals referred to herein are those listed in the Periodic Table of the Elements in the *Handbook of Chemistry and Physics* (61st Edition).

Free magnesia and/or alumina (i.e., apart from the alkaline earth metal containing spinel) also may be included in the present solid sorbent, e.g., using conventional techniques. For example, in one embodiment, the solid sorbent preferably includes about 0.1% to about 30% by weight of free magnesia (calculated as MgO).

As mentioned above, potential solid adsorbents are magnesia rich, magnesium aluminate spinels. One example of such a spinel is a commercial magnesia rich, magnesium aluminate spinel containing 0 to 100 wt. % excess magnesia, 5 to 15 wt. % cerium, and 1 to 5 wt. % vanadium. These adsorbents are substantially described in U.S. Pat. Nos. 4,790,982; 4,472,267; and 4,469,589. The disclosures of U.S. Pat. Nos. 4,790,982; 4,472,267; and 4,469,589 are hereby incorporated herein by reference. Another particularly suitable adsorbent is a magnesium-aluminum spinel with excess magnesia (MgO), and with added RE and other metals, particularly with about 13 wt % RE, about 0.5 wt % La, about 13 wt % $CeO_2$ and about 1.5 wt % V in a 1/16" extrudate. In general, the magnesium aluminate spinels useful in the present invention may be prepared by methods which are conventional and well known in the art.

The following examples are illustrative of sorbents suitable for use in the reactor beds of the present invention.

EXAMPLE 1

A ceria/alumina sorbent was prepared by impregnating high pore value gamma alumina (1/8" extrudate from Dycat International) with a solution of 32.7 grams $Ce(NO_3)_6.6H_2O$ from Aldrich Chemical Company in 45 grams of water, using an incipient wetness technique. The material was dried for three hours at 120° C. (248° F.) and calcined one hour at 700° C. (1,292° F.), in air. The composition was approximately 11% $CeO_2/Al_2O_3$. This material was crushed and sieved to 14/60 mesh (API).

EXAMPLE 2

A magnesium aluminate sorbent was prepared, starting with two solutions. Solution I contained 461.5 grams magnesium nitrate, 68.6 grams of concentrated nitric acid, and 500 mls of water. Solution II contained 209.7 grams sodium aluminate, 10.7 grams sodium hydroxide, and 500 mls of water. To Solution I were added 2 liters of water, and then over a 30 minute period, Solution II. Sodium hydroxide was then added in an amount to bring the pH up to 10.7. The resulting mixture was aged for 16 hours and then filtered. The recovered solids were dried at 170° C. (338° F.) for 12 hours and sized to 14/60 mesh (API). This material had a composition of about $Mg_2Al_2O_5$.

EXAMPLE 3

To make a sorbent with approximately 100 ppm platinum loading, 35 grams of the magnesium aluminate from Example 2 was impregnated using an incipient wetness technique with a solution of 0.013 gram of chloroplatinic acid (37% Pt. assay) in 16 mls of water. The resulting solids were calcined in air at 450° C. (810° F.) for three hours and sized to 14/60 mesh (API).

EXAMPLE 4

A sorbent with approximately 10% ceria loading on magnesium aluminate was prepared by adding a solution of 9.71 grams cerium nitrate in 16 mls of water to 35 grams of magnesium aluminate from Example 1, using an incipient wetness method. The material was then dried for three hours at 120° C. (248° F.), calcined in air one hour at 700° C. (1,292° F.), and sized to 14/60 mesh (API).

To test the sorbents' ability to sorb sulfur oxides from a gas mixture simulating an incinerated Claus tail-gas, 6 grams of each material described in Examples 1–4 were loaded in an 11 mm I.D. quartz reactor with a central thermowell. The reactor was placed in a radiant furnace for rapid heating and cooling. A gas flow of 360 cc/minute with a composition of 1% sulfur dioxide, 4% oxygen, and 95% nitrogen (on a dry basis) was established through the reactor, after the desired sorption temperature was attained. Water, in the amount of about 20% of the gas flow, as added by directing part of the feed gases through a saturator held at about 150° F.

The sulfur dioxide content in the effluent stream was monitored with a Siemens Ultramat 22P infrared analyzer. A cold trap between the reactor and the analyzer removed most of the water on the effluent stream. Sorption experiments were terminated when the sulfur dioxide level in the effluent exceeded 250 ppm. Sulfur dioxide breakthrough was relatively sharp. In general, the analyzer detected no sulfur dioxide for the first 80–90% of the sorption period. Sulfur dioxide concentration of less than 2 ppm during this portion of the sorption was confirmed by measurements with Drager gas measurement tubes. The calculated weight percentage uptake of sulfur oxide as $SO_3$ during the sorption period is reported in the Table below.

Regeneration of the solid sorbent was accomplished by contacting it with hydrogen, which was bubbled through a saturator to obtain about 25% water vapor content. The composition of the off-gas during reductive regeneration was determined by injections on to a Hewlett-Packard 5890 gas chromatograph equipped with a thermal conductivity detector. Usually, both hydrogen sulfide and Sulfur dioxide could be detected in the off-gas, but typically one gas or the other dominated, depending on the sorbent and on operating conditions, as indicated in the following Table.

TABLE

| Sorbent Material Identity | Temperature of Sorption and Regeneration, °F. | Wt % Uptake During Sorption | Dominate Sulfur Compound In Regeneration Off-Gas |
|---|---|---|---|
| $CeO_2/Al_2O_3$ (Ex. 1) | 1,000 | 4.8 | $H_2S$ |
| $CeO_2/Al_2O_3$ | 1,200 | 6.2 | $SO_2$ |
| $Mg_2Al_2O_5$ (Ex. 2) | 1,200 | 4.7 | $H_2S$ |
| $Pt/Mg_2Al_2O_5$ (Ex. 3) | 1,200 | 33.8 | $SO_2$ |
| $CeO_2/Mg_2Al_2O_5$ (Ex. 4) | 1,100 | 14.7 | $H_2S$ |
| $CeO_2/Mg_2Al_2O_5$ | 1,200 | 25.2 | $SO_2$ |

The uptake of $SO_x$ was greater for $Mg_2Al_2O_5$ promoted with Pt (Ex. 3) and with $CeO_2$ (Ex. 4) was higher than for $Mg_2Al_2O_5$ alone (Ex. 2). For the ceria-promoted materials of Examples 1 and 4, magnesium aluminate was a more effective sorbent than alumina, and increasing the operating temperatures from 1000° F. to 1200° F. (Ex. 1), and from 1100° F. to 1200° F. (Ex. 4) increased $SO_x$ sorption which shifted the dominant off-gas sulfur species from $H_2S$ to $SO_2$.

EXAMPLE 5

The carbon monoxide oxidation activity of two sorbents was tested by flowing a mixture of 4% carbon monoxide, 4% oxygen, and 8% carbon dioxide at a flow rate of 310 cc/min over 6 grams of each material in an 11 mm I.D. quartz reactor. Carbon monoxide and carbon dioxide concentration, as a function of reactor temperature, were monitored by Beckman Model 864 infrared analyzers. With the magnesium aluminate of Example 2, carbon monoxide was half converted at about 770° F. and substantially all converted at 860° F. With the platinum-promoted magnesium aluminate of Example 3, carbon monoxide was half converted at about 510° F. and substantially all converted at 540° F. With an empty reactor, there was no detectable carbon monoxide conversion for temperatures up to 1,200° F.

This example demonstrates that the designated sorbents are effective in promoting the removal of carbon monoxide in the presence of oxygen.

Application Ser. No. 07/868,432, filed Apr. 15, 1992, now U.S. Pat. No. 5,229,091, by J. S. Buchanan, D. L. Stern, J. F. Sodomin and G. T. Teitman for Process for Desulfurizing Claus Tail-Gas is incorporated herein by reference. Application Ser. No. 07/868,432 relates to a process for extracting sulfur from a gas containing hydrogen sulfide and sulfur oxides.

While the invention has been described in conjunction with specific embodiments thereof, it is evident that many alternatives, modifications, and variations will be apparent to those skilled in the art in light of the foregoing description. Accordingly, it is intended to embrace all such alternatives, modification, and variations as fall within the spirit and broad scope of the appended claims.

What is claimed is:

1. In a hydrocarbon fueled power plant wherein an oxygen-containing gas is fed to a combustor for combustion of a hydrocarbon fuel to water and carbon dioxide, a method of removing sulfur oxide, carbon monoxide and nitrogen oxide from a flue gas stream from said combustor using said fuel and an oxygen-containing gas comprising the steps of:

combusting said fuel in said combustor with an amount of oxygen-containing gas to convert all sulfur-containing species in said fuel to sulfur oxide and provide a sulfur oxide containing gas stream, and to partially convert said fuel to water and carbon dioxide, the amount of said oxygen-containing gas supplied to said combustor being from about 95% to about 110% of said stoichiometric amount to convert said fuel to carbon dioxide, the amount of said oxygen-containing gas being selected to maintain the concentration of carbon monoxide in said sulfur oxide containing gas stream at from about 500 ppm to about 5,000 ppm, the amount of nitrogen oxide in said sulfur oxide containing gas stream being an inverse function of the amount of carbon monoxide therein;

contacting said sulfur oxide containing gas stream and sufficient additional air with a solid adsorbent bed for adsorbing thereon the sulfur oxides in the form of inorganic sulfates or sulfur oxides or combinations thereof, the solid adsorbent containing a catalytic oxidation promoter for oxidizing the carbon monoxide in said sulfur oxide containing gas stream to carbon dioxide, thus forming a sulfur oxide and carbon monoxide depleted stream with the consequential reduced amount of nitrogen oxide for disposal; and contacting said adsorbent bed with a reducing gas stream for regenerating said adsorbent bed by reducing said retained inorganic sulfates or sulfur oxides or combinations thereof to hydrogen sulfide and/or sulfur dioxide, and thereby forming a hydrogen sulfide and/or sulfur dioxide bearing stream.

2. The method of claim 1 further comprising recovering sulfur from said hydrogen sulfide and/or sulfur dioxide bearing stream.

3. The method of claim 2 wherein the tailgas stream of said sulfur recovering step is combined with air and said sulfur oxide enriched gas stream prior to contacting said solid adsorbent bed.

4. The method of claim 1 further comprising subjecting said hydrogen sulfide and/or sulfur dioxide bearing stream to an amine scrubber treatment.

5. The method of claim 1 wherein said reduced amount of said oxygen-containing gas is selected to maintain the concentration of carbon monoxide in said sulfur oxide enriched gas stream at from about 600 ppm to about 3,500 ppm.

6. The method of claim 1 wherein said depleted stream has less than 2.0 ppm of sulfur oxide and less than 10.0 ppm of carbon monoxide.

7. The method of claim 1 wherein said catalytic oxidation promoter oxidizes dioxins and hazardous organic compounds.

8. The method of claim 1 wherein said adsorbent bed is one bed of a multi-bed system, and wherein:

(a) said sulfur oxide containing gas stream is contacted with first and second serially connected solid adsorbent beds of said multi-bed system for adsorbing therein the sulfur oxides in the form of inorganic sulfates or sulfur oxides or combinations thereof;

(b) a third adsorbent bed is contacted with said reducing gas stream to regenerate said third adsorbent bed by reducing said retained inorganic sulfates or sulfur oxides or combinations thereof to hydrogen sulfide and/or sulfur dioxide, and thereby form a hydrogen sulfide and/or sulfur dioxide bearing stream;

(c) continuing step (a) until an adsorption of said sulfur oxides in the form of inorganic sulfates or sulfur oxides or combinations thereof in said first and second adsorption beds requires that the first bed be removed from series; and then realigning the feeds to each of the beds to place said second and third beds in series with said sulfur oxide containing stream being fed to said second bed, and to place said first bed in a regenerative mode; and (d) repeating steps (a) through (c), wherein each of the three beds are sequentially placed in an initial bed mode in the series, a regenerative mode, and a second bed mode in the series.

9. The method of claim 8, further comprising after regeneration placing said third adsorbent bed in a standby mode until time for realigning the beds.

10. The method of claim 1 wherein said sulfur oxide enriched stream contacting said solid adsorbent bed has an oxygen content of from about 0.1 vol % to about 10.0 vol %.

11. The method of claim 10 wherein oxygen content is from about 2 vol % to about 4 vol %.

12. The method of claim 1 wherein the solid adsorbent bed while adsorbing the sulfur oxides thereon is operated at a gas hourly space velocity of from about 500 GHSV to about 20,000 GHSV, a pressure of from about 0.1 atmospheres to about 10.0 atmospheres, and a temperature of from about 900° F. to about 1400° F.

13. The method of claim 12 wherein the GHSV is from about 3,000 to about 5,000.

14. The method of claim 12 wherein said temperature is from about 1,100° F. to about 1,300° F.

15. The method of claim 12 wherein said pressure is from about 1.5 atmospheres to about 3.0 atmospheres.

16. The method of claim 1 wherein the solid adsorbent bed while being regenerated is operated at a temperature of from about 900° F. to about 1,400° F., at a pressure of from about 0.10 atmospheres to about 10.0 atmospheres, and a gas hourly space velocity 10 GHSV to about 1,000 GHSV.

17. The method of claim 16 wherein said temperature is from about 1,100° F. to about 1,300° F.

18. The method of claim 16 wherein said pressure is from about 0.5 atmospheres to about 3.0 atmospheres.

19. The method of claim 16 wherein said GHSV is from about 100 to about 150.

20. The method of claim 1 wherein the solid adsorbent is alumina impregnated with a rare earth.

21. The method of claim 1 wherein the solid adsorbent is Mg/Al spinels.

22. The method of claim 1 wherein the solid adsorbent is magnesium and aluminum-containing spinel impregnated with vanadium and cerium.

23. The method of claim 1 wherein the solid adsorbent is magnesium aluminate, and wherein the catalytic oxidation promoter is impregnated in said magnesium aluminate.

24. The method of claim 23 wherein said promoter is $CeO_2$ and/or Pt.

25. The method of claim 1 wherein said solid adsorbent bed is in a fluidized bed system comprising a reactor, a regenerator, a conduit for feeding spent adsorbent from the reactor to the regenerator, and another conduit for passing regenerated adsorbent from the regenerator to the reactor; and wherein said sulfur oxide enriched gas stream is fed to the reactor to absorb said inorganic sulfates or sulfur dioxides or combinations thereof on the fluidized adsorbent therein, and said reducing gas stream is fed to the regenerator to reduce said inorganic sulfates or sulfur oxides or combinations thereof on the fluidized adsorbent therein to form said hydrogen sulfide and/or sulfur dioxide bearing stream.

26. The method of claim 1 wherein the hydrocarbon fuel is oil.

27. The method of claim 1 wherein the hydrocarbon fuel is coal.

28. In a hydrocarbon fueled hazardous waste incinerator wherein an oxygen-containing gas is fed to a combustor for combustion of a hydrocarbon fuel to water and carbon dioxide, a method of removing sulfur oxide, carbon monoxide and nitrogen oxide from a flue gas stream from said combustor using said fuel and an oxygen-containing gas comprising the steps of:

combusting said fuel in said combustor with an amount of oxygen-containing gas to convert all sulfur-containing species in said fuel to sulfur oxide and provide a sulfur oxide containing gas stream, and to partially convert said fuel to water and carbon dioxide, the amount of said oxygen-containing gas supplied to said combustor being from about 95% to about 110% of said stoichiometric amount to convert said fuel to carbon dioxide, the amount of said oxygen-containing gas being selected to maintain the concentration of carbon monoxide in said sulfur oxide containing gas stream at from about 500 ppm to about 5,000 ppm, the amount of nitrogen oxide in said sulfur oxide containing gas stream being an inverse function of the amount of carbon monoxide therein;

contacting said sulfur oxide containing gas stream and sufficient additional air with a solid adsorbent bed for adsorbing thereon the sulfur oxides in the form of inorganic sulfates or sulfur oxides or combinations thereof, the solid adsorbent containing a catalytic oxidation promoter for oxidizing the carbon monoxide in said sulfur oxide containing gas stream to carbon dioxide, thus forming a sulfur oxide and carbon monoxide depleted stream with the consequential reduced amount of nitrogen oxide for disposal; and contacting said adsorbent bed with a reducing gas stream for regenerating said adsorbent bed by reducing said retained inorganic sulfates or sulfur oxides or combinations thereof to hydrogen sulfide and/or sulfur dioxide, and thereby forming a hydrogen sulfide and/or sulfur dioxide bearing stream.

29. In a hydrocarbon fueled mineral or metallurgical plant wherein an oxygen-containing gas is fed to a combustor for combustion of a hydrocarbon fuel to water and carbon dioxide, a method of removing sulfur oxide, carbon monoxide and nitrogen oxide from a flue gas stream from said combustor using said fuel and an oxygen-containing gas comprising the steps of:

combusting said fuel in said combustor with an amount of oxygen-containing gas to convert all sulfur-containing species in said fuel to sulfur oxide and provide a sulfur oxide containing gas stream, and to partially convert said fuel to water and carbon dioxide, the amount of said oxygen-containing gas supplied to said combustor being from about 95% to about 110% of said stoichiometric amount to convert said fuel to carbon dioxide, the amount of said oxygen-containing gas being selected to maintain the concentration of carbon monoxide in said sulfur oxide containing gas stream at from about 500 ppm to about 5,000 ppm, the amount of nitrogen oxide in said sulfur oxide containing gas stream being an inverse function of the amount of carbon monoxide therein;

contacting said sulfur oxide containing gas stream and sufficient additional air with a solid adsorbent bed for adsorbing thereon the sulfur oxides in the form of inorganic sulfates or sulfur oxides or combinations thereof, the solid adsorbent containing a catalytic oxidation promoter for oxidizing the carbon monoxide in said sulfur oxide containing gas stream to carbon dioxide, thus forming a sulfur oxide and carbon monoxide depleted stream with the consequential reduced amount of nitrogen oxide for disposal; and contacting said adsorbent bed with a reducing gas stream for regenerating said adsorbent bed by reducing said retained inorganic sulfates or sulfur oxides or combinations thereof to hydrogen sulfide and/or sulfur dioxide, and thereby forming a hydrogen sulfide and/or sulfur dioxide bearing stream.

\* \* \* \* \*